United States Patent Office 3,629,144
Patented Dec. 21, 1971

3,629,144
HEAVY METAL ACID SALT RECOVERY USING ANION EXCHANGE RESIN
George A. Hahn, New Shrewsbury, N.J., and John H. La Rochelle, La Port, Tex., assignors to Shell Oil Company, New York, N.Y.
No Drawing. Filed Aug. 8, 1969, Ser. No. 848,709
Int. Cl. B01j 11/66
U.S. Cl. 252—412                                    2 Claims

ABSTRACT OF THE DISCLOSURE

Heavy metal acid salt epoxidation/hydroxylation catalysts, are recovered in a form suitable for direct recycle by contact of an aqueous solution of said catalysts with a bicarbonate-treated strongly basic anion exchange resin.

BACKGROUND OF THE INVENTION

Acid salts of the acids of heavy metals are effective catalysts for epoxidation and hydroxylation reactions. For example, acid salts of tungsten and molybdenum are disclosed in U.S. 2,833,787 to Carlson et al., as effective catalysts for epoxidation and hydroxylation of ethylenic compounds, especially beta-gamma ethylenic alcohols under acidic conditions. In many such applications, such as the epoxidation of allyl alcohol to glycidol or the hydroxylation of allyl alcohol to glycerol the catalysts utilized are relatively soluble in the reaction product and must be removed from the desired epoxide or triol during subsequent finishing operations. In a simple mode of operation, the dissolved catalyst is separated and discarded. On a commercial scale, such practice can be uneconomic and poses pollution hazards.

In another mode of operation the catalyst is recovered from the discard stream in a form which is not immediately returnable to the epoxidation reactor. For example, incineration of the catalyst-containing waste stream yields an ash containing the catalyst heavy metals which must be further processed prior to return to the epoxidation reactor. Likewise, extensive distillation of the catalyst-containing stream produces a concentrate generally not suitable for immediate recycle because of the inclusion of many heavy contaminants which would tend to build up in the reactor.

A preferred mode of operation would selectively recover the heavy-metal acid catalyst in a form which would be suitable for direct recycle to the epoxidation/hydroxylation reactor and which would not cause impurities to build up in the reactor product. Such a mode of operation is more difficult in the case of catalyst recovery from reaction products of certain processes for the preparation of water soluble triols, such as glycerol, wherein other polyvalent metal anions, particularly phosphates, are introduced into the system so that they are present in the product stream in an amount of from about one tenth the concentration of heavy metal catalyst to about the concentration of the heavy metal catalyst. It is desirable, when recycle is intended, to recover the heavy metal catalyst but reject the other polyvalent anions.

STATEMENT OF THE INVENTION

In accordance with the invention dissolved heavy metal acid salt epoxidation/hydroxylation catalysts are effectively recovered from crude water soluble epoxidation or hydroxylation product in a form suitable for direct recycle to the epoxidation/hydroxylation zone by a process comprising the steps of (a) distilling overhead a major portion of the epoxidation or hydroxylation product to form as bottoms a water-soluble crude catalyst-concentrate, (b) adding water to the catalyst concentrate to form an aqueous solution, (c) contacting the aqueous solution of concentrate with a strongly basic anion exchange resin which has been pretreated with an aqueous solution of an alkali metal bicarbonate, to adsorb the catalyst anions, and, (d) contacting an aqueous solution of an alkali metal bicarbonate with the catalyst-rich resin to regenerate the exchange resin and liberate the heavy metal acid salt in a form suitable for recycle.

DETAILED DESCRIPTION OF THE INVENTION

Essential to the recovery process of the invention is the use of alkali metal bicarbonate-containing regenerating solution. Bicarbonate-containing regenerating solutions are highly advantageous in this application, being highly efficient resin regenerants, being non-corrosive to stainless-steel reaction apparatus, and, importantly, providing a desirable buffering effect for the epoxidation reactor when included in recycled heavy metal salt catalyst. Due to the relatively acidic conditions generally employed in epoxidation/hydroxylation (hereinafter epoxidation) reaction zones danger of a build-up of bicarbonate in the epoxidation reaction zones is minimized, excess bicarbonate decomposing under acid conditions to water and carbon dioxide.

Among the alkali metal bicarbonates, sodium bicarbonate is preferred as a regenerant for reason of economy. Aqueous solutions containing alkali metal bicarbonate in amounts of from about 1% by weight to saturation are generally acceptable with aqueous solutions containing from about 3% to about 20% by weight alkali metal bicarbonate being very suitable. Most preferred regenerating solutions comprise aqueous solutions containing from about 5% to about 10% by weight of sodium bicarbonate.

A solid strongly basic anion exchange resin may be used for the recovery of the epoxidation catalyst. As as class, these resins are high molecular weight polybases which are virtually insoluble in the aqueous media to be treated. They consist of a three-dimensional polymer network to which are attached a plurality of strongly basic groups which act as anion exhangers.

Very suitable as exchange resins in the instant process, especially when the process is applied to the recovery of heavy metal catalyst from ionizable phosphate-containing water soluble hydroxylation materials, are the strongly basic quaternary ammonium anion exchange resins, typical of which are the products of amination with trimethylamine or dimethyl ethyl amine of chloromethylated polymer networks. Styrene-divinylbenzene copolymers containing at least about 5% by weight of divinylbenzene are especially suitable polymer networks with styrenedivinylbenzene copolymers conaining from about 8% to about 20% by weight of divinylbenzene being preferred. Representative commercially available exchangers of this type are Amberlite IRA-904, IRA-911, IRA-900, and IRA-910, of Rohm and Haas Company, Dowex-2 and Dowex-2 of Dow Chemical Company, Nalcite SBR and SAR of National Aluminate Corporation, Permutit S-2 of Permutit Company, and Duolite A-42 and A-40 of Chemical Process Company.

Especially suitable among the quaternary ammonium styrene-divinylbenzene exchangers are the highly cross-linked macroreticular quaternary ammonium anion exchange resins, with resins having average pore diameters of at least about 250 A. being preferred, resins having pore diameters of from about 300 A. to 1000 A. being especially preferred.

Amberlite IRA-904 is a representative exchanger of this most preferred type.

The process of the invention is suitably applied to the recovery of salts of the acids of heavy metals used as catalysts in epoxidation and and hydroxylation reactions. It is very advantageousy applied to the recovery of the salts of the acids of tungsten and molybdenum, for example, epoxidation and hydroxylation catalysts comprising tungstates, borotungstates, chromotungstates, molybdotungstates, phosphotungstates, tellurotungstaes, molybdates, phosphomolybdates, bismomolybdates, and the like may be recovered. It is most useful for the recovery of tungstate catalysts, for example, sodium tungstate and sodium hydrogen tungstate, from water soluble ionizable phosphate and glycerol containing allyl alcohol hydroxylation product, such catalysts generally being present in concentration of from about 0.02% to about 0.2% by weight in the hydroxylation product. Ionizable phosphate, which is generally present in concentration of from about 0.01% by weight to about 0.1% by weight and which is unsuitable for recycle, is rejected in such a case.

In practicing the present invention, the heavy metal acid salt catalyst to be recovered is first separated from the bulk of the reaction product by distillation wherein the epoxidation/hydroxylation product and other relatively volatile components, such as for example, unreacted ethylenically unsaturated feed materials, are taken overhead in one or more distillation zones and a final distillation bottoms product is separated containing the heavy metal acid salt catalyst, residual water-soluble epoxidation product, and various unidentified organic and inorganic impurities.

To this final distillation bottoms product is added sufficient water to form a solution of the heavy metal acid salt. Although the concentration of heavy metal acid is not critical and may vary widely, generally the concentration of salt is maintained between about 0.05% to about 5.0% by weight.

Prior to contacting the distillation bottoms-water mixture with the anion exchange resin, it may be desirable to subject the mixture to one or more conventional separation processes such as, for example, filtration, decantation, centrifugation, phase separation, and the like, to remove undissolved solids and/or undissolved organic materials which might contaminate or foul the exchange resin.

The aqueous solution thus produced is brought into intimate contact with an anion exchange resin of the type described under ambient pressure and at a temperature of from about ambient to about 75° C. Higher temperatures lower the solution viscosity but can decrease the effective life of the ion exchange resin. Temperatures of from about 35° C. to about 55° C. are preferred. Contacting may be effected by mixing the solid resin with the solution and then filtering off the catalyst-free liquid or, in a generally preferred mode of operation, by passing the liquid through a bed of the resin until a reappearance of catalyst in the effluent indicates approaching exhaustion of the resin. In either case, the used resin is optionally regenerated in a conventional manner by contact with bicarbonate solution and then reused.

Exchanger regeneration with bicarbonate is suitably effected at ambient conditions of temperature and pressure. If desired, higher temperatures may be employed.

It is generally desirable to employ an excess of bicarbonate regenerant, over the amount of heavy metal acid salt adsorbed on the exchanger. This leads to more complete removal of the adsorbed catalyst by the regenerant solution. This excess of bicarbonate which accompanies the recovered heavy metal acid salt is in no way deliterious to the use of the recovered salt as epoxidation catalyst. It is suitable to use regenerant in amount of from about 1.1 to about 6 times the molar amount of heavy metal acid salt adsorbed on the exchanger with bicarbonate amounts of from about 1.25 to about 3 times the heavy metal acid salt being preferred.

EXAMPLE I

A crude material containing sodium tungstate epoxidation/hydroxylation catalyst, obtained as a bottoms fraction from the distillation of the hydroxylation product of allyl alcohol and not suitable for recycle to the epoxidation reaction zone because of organic and inorganic contamination, e.g. about 0.03% by weight ionizable phosphate, was dissolved in water to form a solution containing 1% by weight sodium tungstate. This solution was passed for approximately 1 hour at a liquid hourly space velocity of 5 hr.$^{-1}$ and at a temperature of about 25° C. through a ¾" x 24" vertical tube filled with 67 grams of Amberlite IRA–904 anion exchange resin which had been freshly regenerated by treatment with an 8% by weight solution of sodium bicarbonate. Tungstate concentration of the resin bed effluent was monitored at below about 0.02% by weight. Following passage of approximately 5 bed weights of tungstate-containing solution, the tungstate concentration of the effluent rose to above 0.8% by weight indicating pending exhaustion of the resin bed. Tungstate solution flow was halted, and after a brief water rinse of the resin with water, was followed by a 3.5 bed weight backwash with an 8% by weight aqueous solution of sodium bicarbonate at a liquid hourly space velocity of 7 hr.$^{-1}$ and a temperature of 25° C. Following a second brief water rinse, the cycle was repeated, tungstate solution flow being resumed until the tungstate concentration of the effluent exceeded 0.8% by weight whereupon the resin was regenerated by bicarbonate backwash.

The process was repeated through over 1000 cycles. The resin's tungstate adsorption capacity decreased only slowly. The tungstate capacity of the resin was measured by measuring the number of bed weights of crude solution which could be passed over the resin before the 0.8% effluent tungstate concentration was exceeded. Initially the capacity was about 5 bed weights of solution, after 400 cycles the capacity was 4.3 bed weights, after 1000 cycles the capacity was 4.1 bed weights.

The tungstate- and bicarbonate-containing backwash effluent was analyzed and found to be very suitable for recycle to the epoxidation reaction zone, containing about 0.8% by weight tungstate, about 3.0% by weight sodium bicarbonate, and only very minor traces of impurities such as ionizable phosphate or stannate.

EXAMPLES II–IV

Strongly basic anion-exchange resins are often regenerated with hydroxide solutions. Carbonates are also used. The heavy metal salt, thus recovered, would be suitable for recycle as catalyst for epoxidation reactions.

In three batch experiments sodium hydroxide and sodium carbonate regenerants were compared with a sodium bicarbonate regenerating solution according to the invention.

Three samples of Amberlite IRA–904 anion exchange resin were saturated with sodium tungstate-containing solution, the resin was then rinsed with water and the weight of tungsten present on the resin determined by neutron-activation-analysis. The three resin samples were then equivalently treated with excesses of one each of the three regenerating solutions, i.e. sodium bicarbonate, sodium hydroxide, and sodium carbonate. Following rinsing, the weight of tungsten present on the resin following regeneration was measured by neutron-activation-analysis. Quite unexpectedly, it was found that sodium bicarbonate removed 63% of the adsorbed tungstate while sodium hydroxide and sodium carbonate removed but 31.4% and 20.5%, respectively.

We claim as our invention:

1. A process for the recovery of sodium tungstate epoxidation/hydroxylation catalyst in a form suitable for recycle from water soluble epoxidation/hydroxylation products comprising the sequential steps of:
   (a) distilling overhead a major portion of the epoxidation/hydroxylation product to form as distillation bottoms a crude catalyst concentrate, (b) adding water to said catalyst concentrate to form an aqueous solution, (c) contacting the aqueous solution of catalyst concentrate with a strongly basic styrene/divinylbenzene copolymer anion exchange resin containing quaternary ammonium groups and having a highly cross-linked macroreticular structure and an average pore diameter of at least about 250 A. which has been pretreated with an aqueous solution of an alkali metal bicarbonate, to adsorb the catalyst anions and, (d) contacting a 3–20% by weight aqueous solution of an alkali metal bicarbonate with the catalyst-rich resin and recovering the resulting catalyst-containing effluent.

2. The process in accordance with claim 1 wherein said epoxidation/hydroxylation products comprise the reaction products of the hydroxylation of allyl alcohol to glycerol and wherein said reaction products also contain ionizable phosphate.

References Cited
UNITED STATES PATENTS

| | | | |
|---|---|---|---|
| 2,833,787 | 5/1958 | Carlson et al. | 260—635 |
| 2,862,978 | 12/1958 | Skinner et al. | 260—635 |
| 2,968,527 | 1/1961 | Baker | 23—15.5 |
| 3,231,329 | 1/1966 | Weiss et al. | 23—140 |

FOREIGN PATENTS

| | | | |
|---|---|---|---|
| 894,592 | 4/1962 | Great Britain | 260—635 |

DANIEL E. WYMAN, Primary Examiner

P. E. KONORKA, Assistant Examiner

U.S. Cl. X.R.

23—15 W, 51; 252—411; 260—348.5 L, 635 H